United States Patent [19]

Ishii et al.

[11] Patent Number: 5,421,332
[45] Date of Patent: Jun. 6, 1995

[54] ULTRASOUND IMAGING DEVICE IN MEDICINE DISPLAYING FREEZE-FRAME WITHOUT FLICKERING

[75] Inventors: Yuichiro Ishii; Wataru Yagi, both of Kanagawa, Japan

[73] Assignee: Fujitsu Limited, Kangawa, Japan

[21] Appl. No.: 306,195

[22] Filed: Sep. 14, 1994

[30] Foreign Application Priority Data

Dec. 10, 1993 [JP] Japan .................. 5-310843

[51] Int. Cl.6 .............................................. A61B 8/00
[52] U.S. Cl. .............................................. 128/660.07
[58] Field of Search ................. 128/660.01, 660.04, 128/660.05, 660.06, 660.07, 661.03; 73/620, 621, 624, 633

[56] References Cited

U.S. PATENT DOCUMENTS

4,683,893 8/1987 Mayo ............................. 128/660.06
4,982,339 1/1991 Insana et al. .................. 128/660.01
5,016,642 5/1991 Dukes ............................ 128/660.07

*Primary Examiner*—George Manuel

[57] ABSTRACT

An ultrasound imaging device having functions of storing data of at least one image in a memory and reading the data from the memory to show a freeze-frame on a display in response to a freeze instruction given by a user includes a discerning signal generation unit for generating a discerning signal which marks a change from one image frame to a next image frame in a video signal of ultrasound images, a discerning signal adding unit for marking a point of the change in the video signal by adding the discerning signal to the video signal, a control unit for stopping image data of the video signal from being stored in the memory after receiving the freeze instruction at a moment when the discerning signal is detected in the video signal, so that last two fields of the video signal stored in the memory and forming the freeze-frame are an even field and an odd field of the same frame.

9 Claims, 6 Drawing Sheets

ULTRASOUND IMAGING DEVICE IN MEDICINE DISPLAYING FREEZE-FRAME WITHOUT FLICKERING

BACKGROUND OF THE INVENTION

1. Field of the Invention

The present invention generally relates to ultrasound imaging devices in medicine, and particularly relates to an ultrasound imaging device in medicine displaying a freeze-frame of an ultrasound image.

2. Description of the Prior Art

Figure 1:
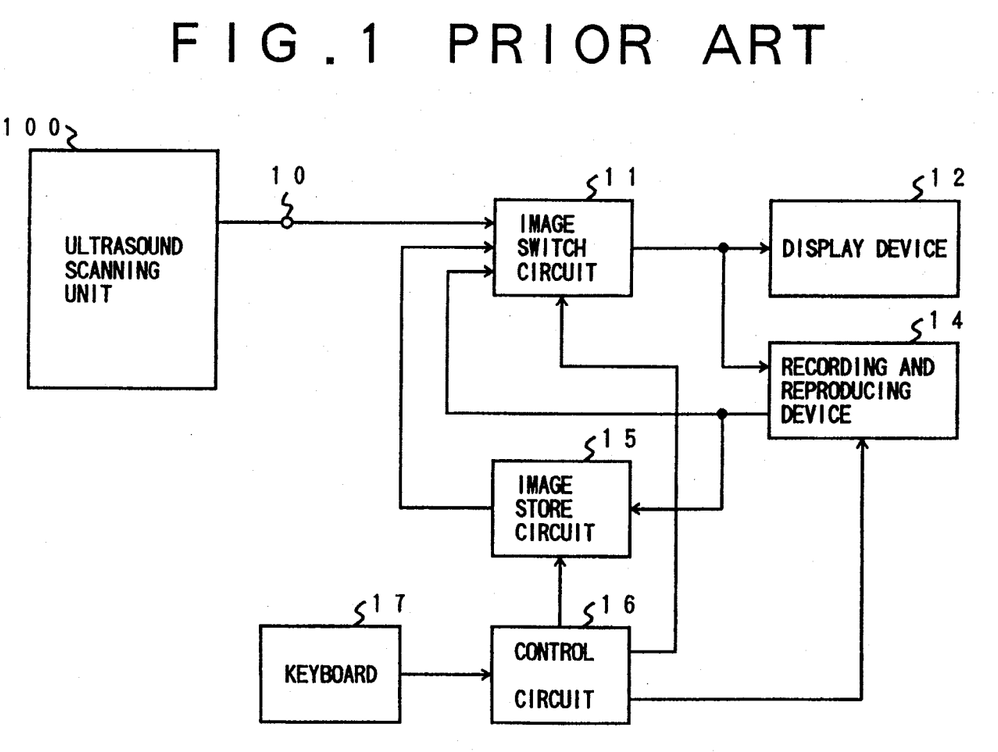
FIG. 1 is a block diagram of an ultrasound imaging device of the prior art.

FIG. 1 shows a block diagram of an ultrasound imaging device in medicine of the prior art. In FIG. 1, the ultrasound imaging device comprises an ultrasound scanning unit 100, a video signal node 10, an image switch circuit 11, a display device 12, a recording and reproducing device 14, an image store circuit 15, a control circuit 16, and a keyboard 17.

A video signal of images for diagnostic purposes which is provided by the ultrasound scanning unit 100 is applied to the node 10, and, thence, provided for the image switch circuit 11. From a plurality of video signal inputs, an image switch circuit 11 selects one video signal for its output, which is supplied to the display device 12 for displaying image data for diagnosis. At the same time, the same video signal output from the image switch circuit 11 is provided for the recording and reproducing device 14 for recording the collected images.

In a reproducing mode of the device, the recording and reproducing device 14 reproduces a video signal of diagnosis images, which signal is then supplied to the image switch circuit 11 and to the image store circuit 15. The image store circuit 15 digitizes a received video signal, and stores the digitized data into a frame memory thereof. Also, the image store circuit 15 in a reproducing mode sequentially reads out image data from the frame memory, and transforms it into an analog signal to provide for the image switch circuit 11.

The control circuit 16 controls the switching of the image switch circuit 11 according to instructions given through operations on the keyboard 17. Controlled by the control circuit 16, the image switch circuit 11 selects a video signal output from the plurality of video signal inputs provided from the node 10, the recording and reproducing device 14, and the image store circuit 15. Also, the control circuit 16 controls the operation of the recording and reproducing device 14 and the write operation of the image store circuit 15. The image store circuit 15 carries out a write operation and a read operation on the frame memory.

When an instruction to display a freeze-frame is given by the keyboard 17, the control circuit 16 orders the image store circuit 15 to stop writing data into the frame memory. The image store circuit 15 stops writing as instructed, but continues to read out image data form the frame memory. Since this image data stays the same without being rewritten, the image store circuit 15 outputs a video signal of the same image, i.e., a freeze-frame. In this situation, the display device 12 shows a freeze-frame.

Figure 2A:
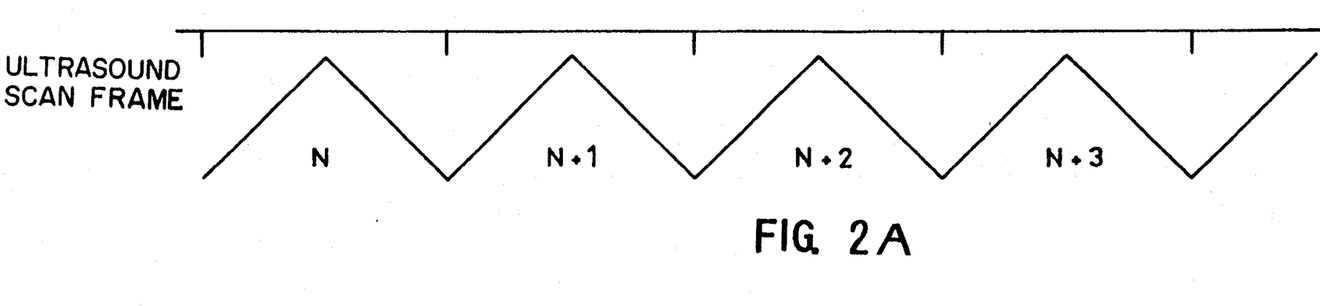
FIG. 2 is a time chart showing relations between ultrasound scan frames, image fields, and displayed images.
Figure 2B:
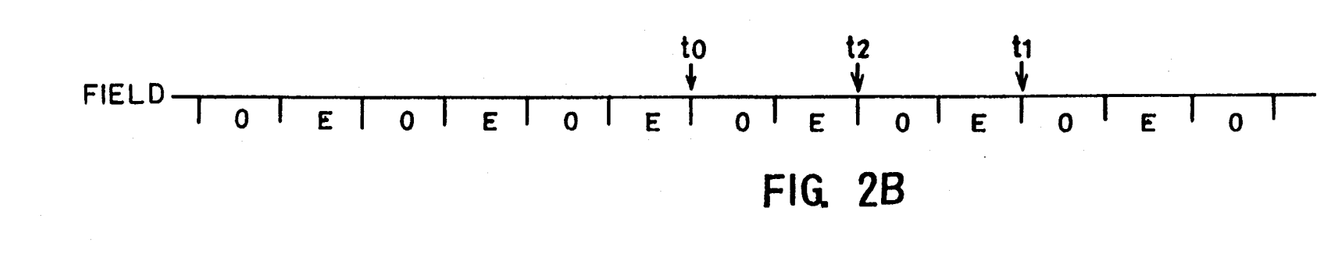
Figure 2C:
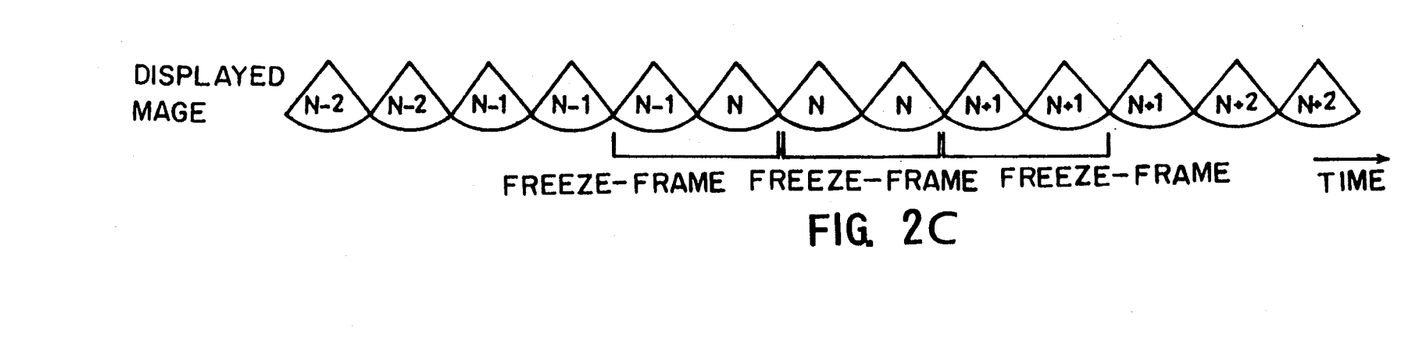

FIG. 2 is an illustrative drawing showing the operation of the ultrasound imaging device operating in the B-mode to provide cross-section images. When a time length required for the scanning of one image, i.e., an ultrasound scan frame period, is odd number times (at least three times) as long as the field period of a video signal, frames of ultrasound scanning images as shown at the bottom of FIG. 2 are displayed on the display device 12. In FIG. 2, E denotes an even number field, and 0 an odd number field.

When an instruction to freeze the display image is given at a time t1 while ultrasound images shown in FIG. 2 are being reproduced from the recording and reproducing device 14, a freeze-frame without flickering is displayed because an odd number field and an even number field of the same image are repeatedly displayed one after another. Those two fields are of the same image corresponding to a frame N+1 because the instruction is given at an instance when the frame memory contains the two fields of the frame N+1 as the last two stored fields.

However, when an instruction to freeze the display image is given at a time to, a freeze-frame with flickering will be displayed because an odd number field and an even number field of different images are repeatedly displayed one after another. Those two fields are from different images because the instruction is given at an instance when the frame memory contains an odd number field of a frame N−1 and an even number field of the frame N as the last two stored fields.

Accordingly, there is a need in the field of ultrasound imaging devices in medicine for an ultrasound imaging device which can prevent a displayed freeze-frame from flickering.

SUMMARY OF THE INVENTION

Accordingly, it is a general object of the present invention to provide an ultrasound imaging device which can satisfy the need described above.

It is another and more specific object of the present invention to provide an ultrasound imaging device which can prevent a displayed freeze-frame from flickering.

In order to achieve the above objects, an ultrasound imaging device according to the present invention having functions of storing data of at least one image in a memory and reading the data from the memory to show a freeze-frame on a display in response to a freeze instruction given by a user includes a discerning signal generation unit for generating a discerning signal which marks a change from one image frame to a next image frame in a video signal of ultrasound images, a discerning signal adding unit for marking a point of the change in the video signal by adding the discerning signal to the video signal, a control unit for stopping image data of the video signal from being stored in the memory after receiving the freeze instruction at a moment when the discerning signal is detected in the video signal, so that last two fields of the video signal stored in the memory and forming the freeze-frame are an even field and an odd field of the same frame. Since the freeze-frame is comprised of an odd number field and an even number field of the same image frame, no visible flicker appears on the freeze-frame displayed on the display.

Other objects and further features of the present invention will be apparent from the following detailed description when read in conjunction with the accompanying drawings.

DESCRIPTION OF THE PREFERRED EMBODIMENTS

Figure 3:
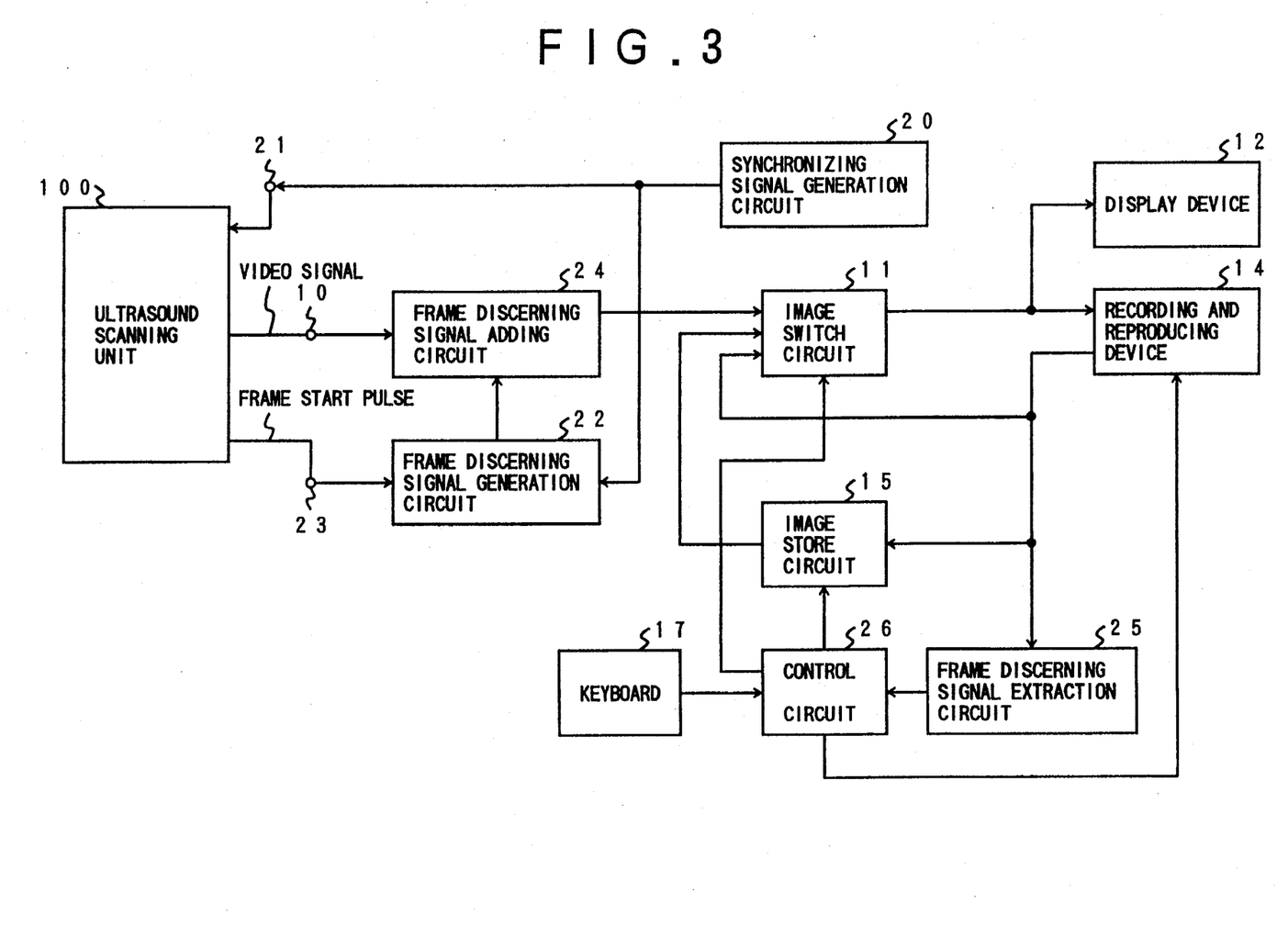
FIG. 3 is a block diagram of an ultrasound imaging device according to a first embodiment of the present invention.

FIG. 3 shows a block diagram of a device according to a first embodiment of the present invention. In FIG. 3, the same elements as those of FIG. 1 are referred to by the same numerals, and will be given no further description.

In FIG. 3, a synchronizing signal generation circuit 20 produces a vertical synchronizing signal and a horizontal synchronizing signal, and provides them for the ultrasound scanning unit 100 and for a frame discerning signal generation circuit 22. The ultrasound scanning unit 100 provides a node 23 with a frame start pulse, which indicates the beginning of each ultrasound scan frame and is supplied to the frame discerning signal generation circuit 22.

At the first pulse of the vertical synchronizing signal after receiving a frame start pulse, the frame discerning signal generation circuit 22 starts counting a predetermined number of pulses of the horizontal synchronizing signal. The frame discerning signal generation circuit 22 produces a frame discerning signal having a white level during a period of a predetermined one of horizontal scans, which signal is then applied to a frame discerning signal adding circuit 24. The predetermined one of horizontal scans is, for example, a fifteenth or sixteenth (more or less) horizontal scan during a vertical blanking period, or a horizontal scan corresponding to the display location of the top of the display during a vertical scanning period.

The ultrasound scanning unit 100 provides the node 10 with a video signal of ultrasound images in synchronism with vertical and horizontal synchronizing signals produced by the synchronizing signal generation circuit 20. Via the node 10, this video signal is supplied to the frame discerning signal adding circuit 24. Then, the frame discerning signal is added to the video signal in the frame discerning signal adding circuit 24. Thus, the video signal ends up having a white level of a frame discerning signal during the period of the predetermined horizontal scan within a vertical scanning period immediately following a change of frames in ultrasound scanning.

The video signal attached with the frame discerning signal is provided for the image switch circuit 11, and, then, supplied to the display device 12 and to the recording and reproducing device 14 if selected at the image switch circuit 11.

The recording and reproducing device 14 reproduces a video signal attached with a frame discerning signal, which is provided for the image switch circuit 11, the image store circuit 15, and a frame discerning signal extraction circuit 25. The frame discerning signal extraction circuit 25 extracts vertical and horizontal synchronizing signals from the provided video signal, and keeps count of the predetermined number of pulses of the horizontal synchronizing signal by using the vertical synchronizing signal as a reference signal so as to produce a mark signal indicating the horizontal scan period which is attached with a frame discerning signal. Then, the frame discerning signal extraction circuit 25 compares the received video signal with a reference level during the time period indicated by the mark signal to extract the white level of frame discerning signal. If the frame discerning signal is extracted, an extraction signal is provided for the control circuit 26.

When an instruction to display a freeze-frame is given by the keyboard 17 while the recording and reproducing device 14 is working in the reproducing mode, the control circuit 26 orders the image store circuit 15 to stop writing image data into the frame memory. Here, the control circuit 26 gives this order upon receiving the extraction signal from the frame discerning signal extraction circuit 25, and, at the same time, provides a control signal for the image switch circuit 11 to switch from a video signal from the recording and reproducing device 14 to a video signal from the image store circuit 15.

In this case, even if the instruction to display a freeze-frame is given at the time t0 of FIG. 2, the image store circuit 15 stops writing into the frame memory at the time t2. The time t2 is a point of time when ultrasound scan frames are changed from N to N+1 and when the frame discerning signal is extracted. Thus, an odd number field and an even number field of the ultrasound scan frame N are stored in the frame memory as the last two fields, and are repeatedly read out one after another, so that a freeze-frame is displayed without flickering.

Figure 4:
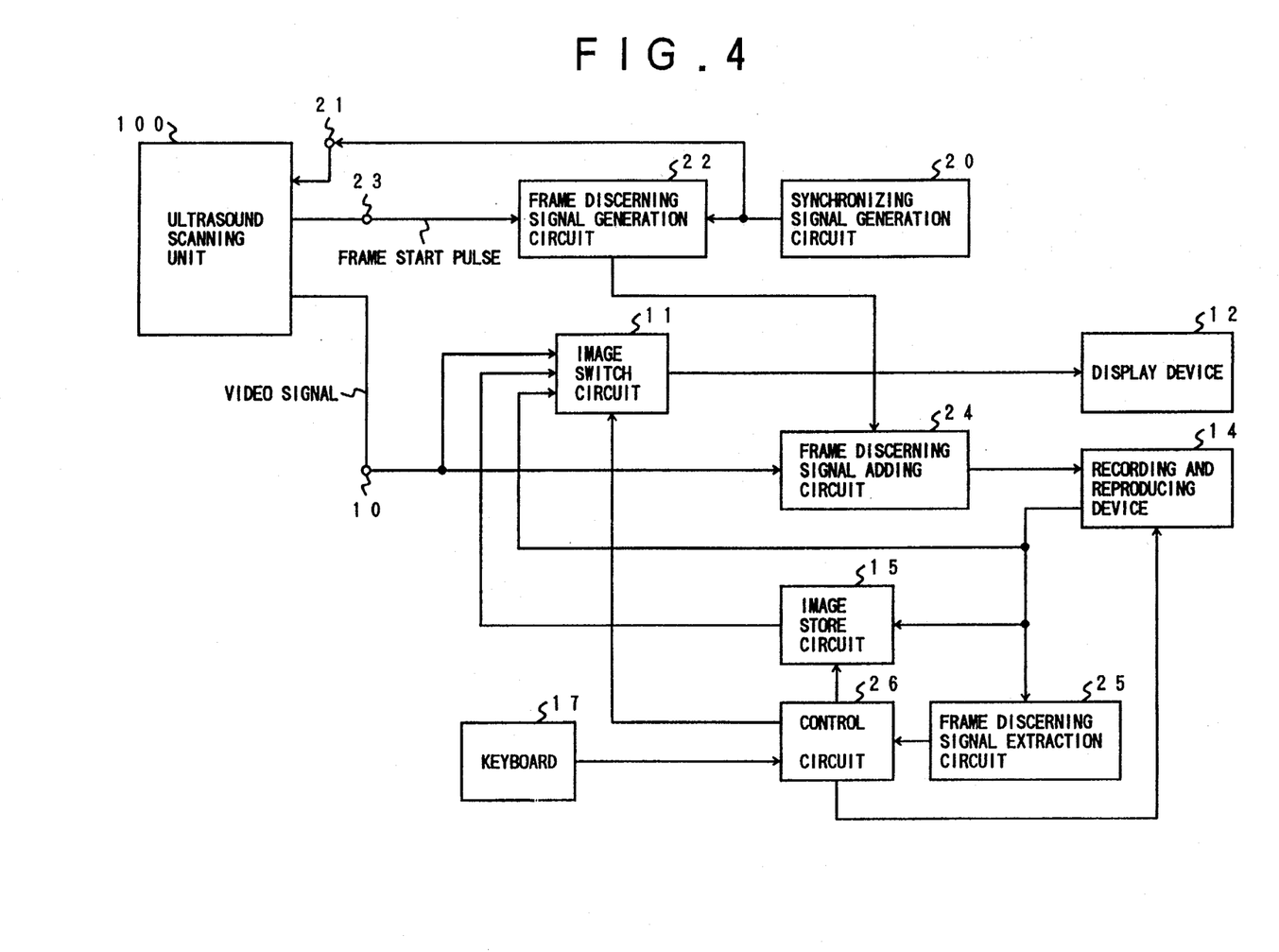
FIG. 4 is a block diagram of an ultrasound imaging device according to a second embodiment of the present invention, which device is a variation of the device of FIG. 3.

FIG. 4 shows a block diagram of a device according to a second embodiment of the present invention, which device is a variation of the device of FIG. 3. In FIG. 4, a video signal supplied to the node 10 from the ultrasound scanning unit 100 is provided for the frame discerning signal adding circuit 24 and for the image switch circuit 11. A video signal output of the frame discerning signal adding circuit 24 is directly applied to the recording and reproducing device 14. A video signal output of the image switch circuit 11 is provided for the display device 12 only.

In this case, when the image switch circuit 11 selects a video signal from the node 10, a video signal without a frame discerning signal is provided for the display device 12 to be displayed. Thus, even in the case that the frame discerning signal is added to a horizontal scan corresponding to a display location of the top of the display within a vertical scanning period, the frame discerning signal is not displayed as a noise at the top of the display as long as the video signal from the node 10 is provided for the display device 12.

In ultrasound imaging device in medicine, there are different modes with regard to the type of displayed images. Those different modes include an A-mode which displays the amplitude of a received echo, a B-mode which displays a cross-section image, and an M-mode which displays as curves the transition in time of movement of the portion to be diagnosed. In these different modes, a predetermined one of horizontal scan periods within a vertical synchronizing signal of each field is added a mode discerning signal for discerning a mode in use from other modes.

Figure 5:
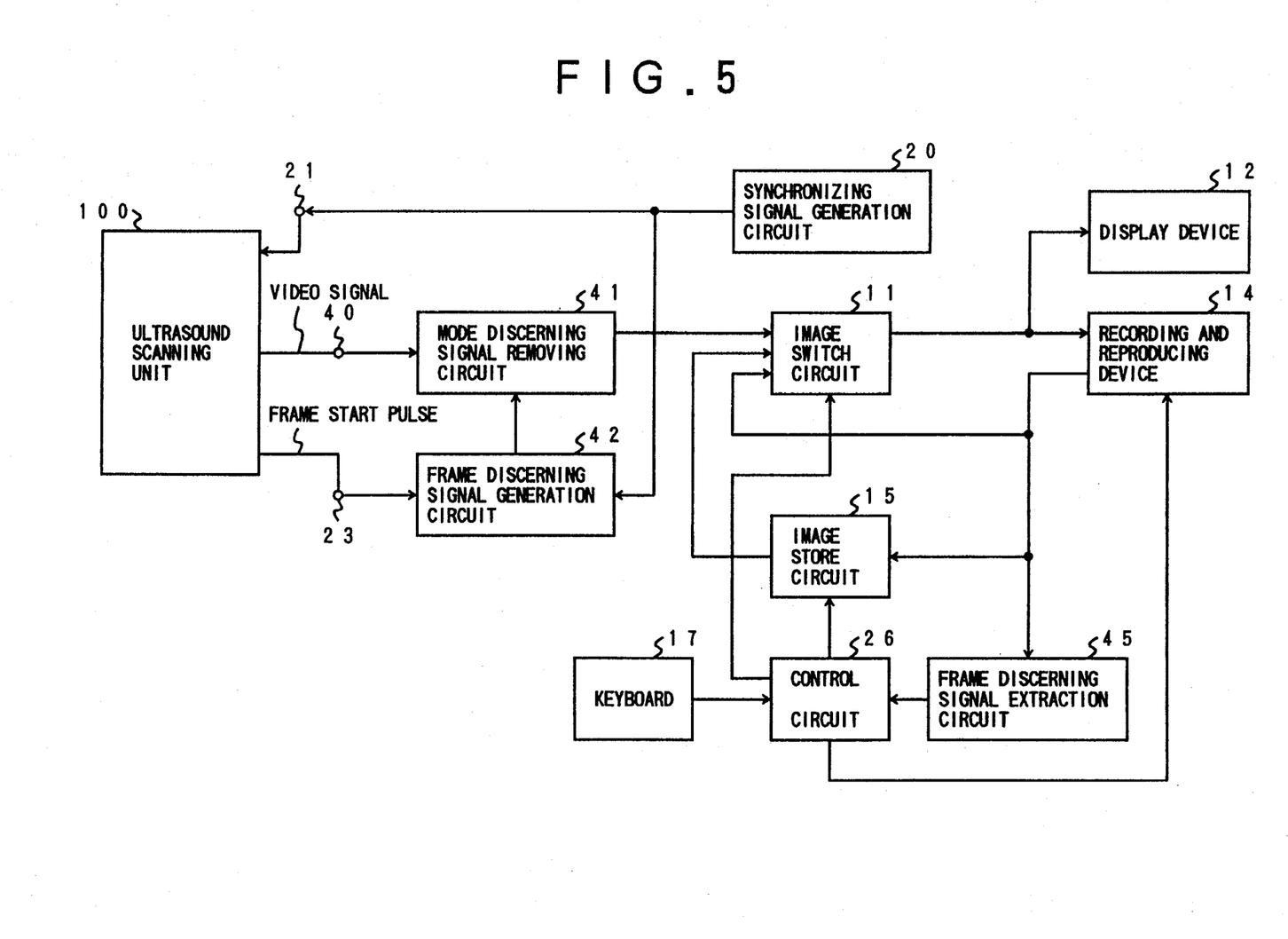
FIG. 5 is a block diagram of an ultrasound imaging device according to a third embodiment of the present invention, which device utilizes a mode signal indicating an operation mode of the ultrasound imaging device.

A device according to a third embodiment of the present invention taking advantage of this mode discerning signal is shown in FIG. 5.

In FIG. 5, a B-mode video signal, for example, with a mode discerning signal attached is supplied to the node 40 to be provided for a mode discerning signal removing circuit 41. The mode discerning signal removing circuit 41 is comprised of switches, and provides as an output a video signal from the node 40 when a frame discerning signal is not supplied by the frame discerning signal generation circuit 42. When a frame discerning signal having a high level is provided, the mode discerning signal removing circuit 41 outputs a video signal whose corresponding period is set to a pedestal level.

Upon receiving a frame start pulse from the node 23, the frame discerning signal generation circuit 42 keeps count of a predetermined number of pulses of the horizontal synchronizing signal by using the vertical synchronizing signal as a reference signal so as to generate a frame discerning signal having the high level during a period corresponding to the predetermined horizontal scan period of a mode discerning signal. Thereby a mode discerning signal immediately after a change of frames in ultrasound scans is eliminated from a video signal.

The frame discerning signal extraction circuit 45 extracts vertical and horizontal synchronizing signals from the reproduced video signal, and keeps count of the predetermined number of pulses of the horizontal synchronizing signal by using the vertical synchronizing signal as a reference signal so as to produce a mark signal indicating the horizontal scan period which is attached with a mode discerning signal. Then, the frame discerning signal extraction circuit 45 compares the video signal with a reference level during the time period indicated by the mark signal so as to extract the mode discerning signal. If the mode discerning signal is not extracted during that time period, an extraction signal of a frame discerning signal is provided for the control circuit 26.

Similarly to the case described above, even if the instruction to display a freeze-frame is given at the time t0 of FIG. 2, the image store circuit 15 stops writing into the frame memory at the time t2. The time t2 is a point of time when ultrasound scan frames are changed from N to N+1 and when the extraction signal is provided. Thus, an odd number field and an even number field of the ultrasound scan frame N are stored in the frame memory as the last two fields, and are repeatedly read out one after another, so that a freeze-frame is displayed with no flicker in the same manner as in the device of FIG. 3.

Figure 6:
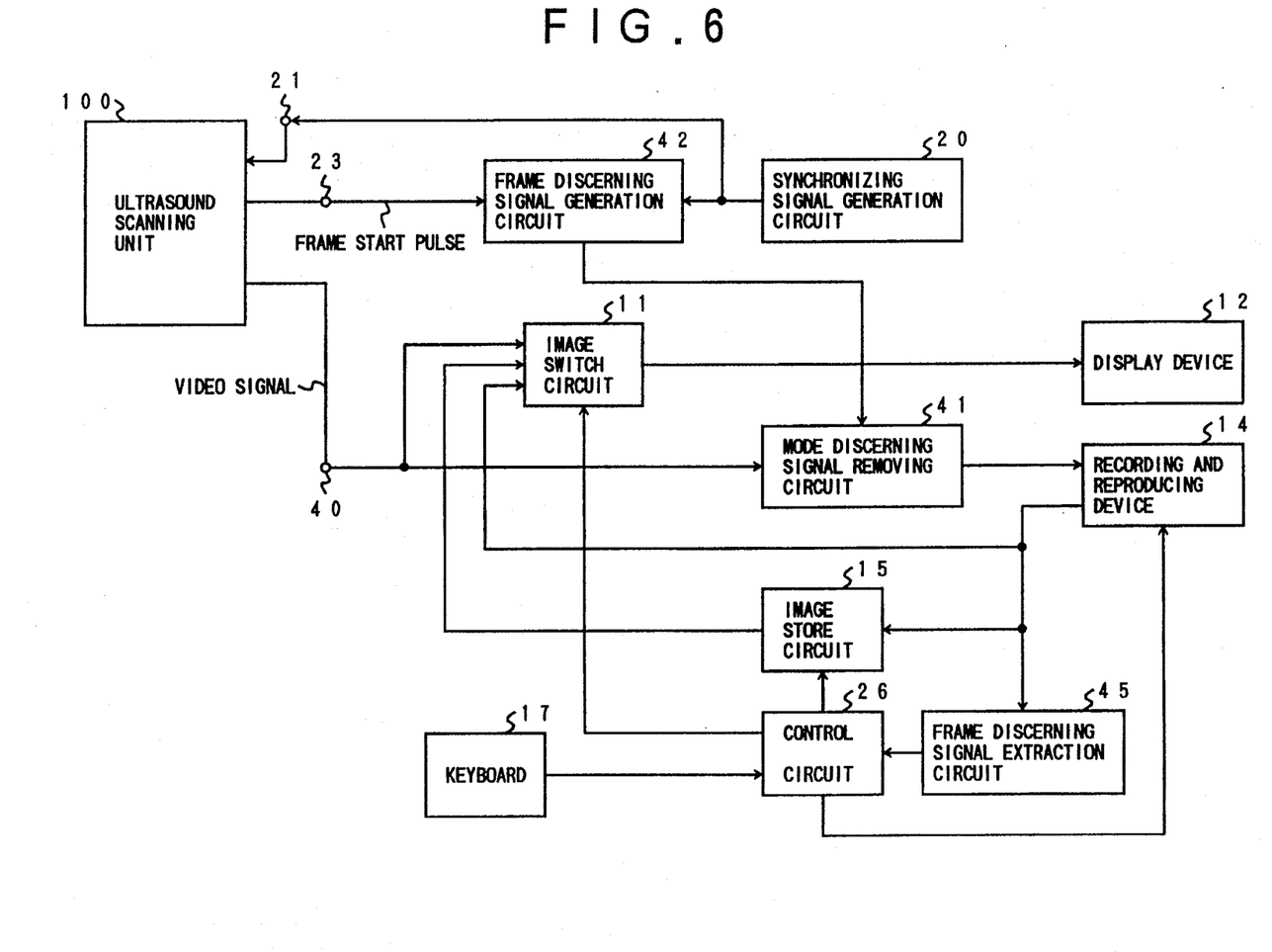
FIG. 6 is a block diagram of an ultrasound imaging device according to a fourth embodiment of the present invention, which device is a variation of the device of FIG. 5.

Furthermore, it is apparent that the same effect described above can be obtained by a configuration shown in FIG. 6. FIG. 6 shows a device according to a fourth embodiment of the present invention, which device is a variation of the device of FIG. 5.

In FIG. 6, the configuration of the device is such that a video signal from a node 40 is provided for the mode discerning signal removing circuit 41 and for the image switch circuit 11, a video signal output of the mode discerning signal removing circuit 41 is directly supplied to the recording and reproducing device 14, and a video signal output of the image switch circuit 11 is provided for the display device 12 only.

As described above, the ultrasound imaging device according to the present invention can prevent a freeze-frame from flickering so that an accurate diagnosis can be made using a freeze-frame without flickering. Thus, the ultrasound imaging device according to the present invention can be highly effective for practical purposes.

Further, the present invention is not limited to these embodiments, but various variations and modifications may be made without departing from the scope of the present invention.

What is claimed is:

1. An ultrasound imaging device having functions of storing data of at least one image in a memory and reading the data from the memory to show a freeze-frame on a display in response to a freeze instruction given by a user, said ultrasound imaging device comprising:

discerning signal generation means for generating a discerning signal which marks a change from one image frame to a next image frame in a video signal of ultrasound images;

discerning signal adding means for marking a point of said change in said video signal by adding said discerning signal to said video signal; and control means for stopping image data of said video signal from being stored in the memory after receiving the freeze instruction at a moment when said discerning signal is detected in said video signal, so that last two fields of said video signal stored in said memory and forming the freeze-frame are an even field and an odd field of the same frame.

2. The ultrasound imaging device as claimed in claim 1, further comprising discerning signal extraction means for detecting said discerning signal in said video signal and for sending a detection signal to said control means when detecting said discerning signal, wherein said control means stops image data of said video signal from being stored in the memory after receiving the freeze instruction at a moment when said detection signal is received.

3. The ultrasound imaging device as claimed in claim 2, wherein said discerning signal generation means generates said discerning signal by using a vertical synchronizing signal of said video signal as a reference signal.

4. The ultrasound imaging device as claimed in claim 3, wherein said discerning signal generation means generates said discerning signal for one horizontal scanning period of said video signal, said one horizontal scanning period being at a predetermined point in time in relation to said vertical synchronizing signal.

5. The ultrasound imaging device as claimed in claim 1, further comprising recording and reproducing means for recording and reproducing said video signal, said recording and reproducing means providing the reproduced video signal for said memory.

6. The ultrasound imaging device as claimed in claim 2, wherein said discerning signal adding means marks a point of said change in said video signal by removing a mode signal positioned at a predetermined location of the video signal for indicating an operation mode of the ultrasound imaging device, said predetermined location being able to be identified by the discerning signal when removing said mode signal, and said discerning signal extraction means sends said detection signal to said control means when detecting none of said mode signal in said predetermined location.

7. The ultrasound imaging device as claimed in claim 4, wherein said discerning signal adding means marks a point of said change in said video signal by removing a mode signal positioned at a predetermined location of the video signal for indicating an operation mode of the ultrasound imaging device, said predetermined location being able to be identified by the discerning signal when removing said mode signal, and said discerning signal extraction means sends said detection signal to said control means when detecting none of said mode signal in said predetermined location.

8. An ultrasound imaging device having functions of storing data of at least one image in a memory and reading the data from the memory to show a freeze-frame on a display in response to a freeze instruction given by a user, said ultrasound imaging device comprising:

ultrasound scanning means for providing a video signal of ultrasound images which is made by transmitting ultrasound pulses and receiving echoes;

keyboard means for receiving the freeze instruction and sending a freeze instruction signal;

discerning signal generation means for generating a discerning signal which marks a change from one image frame to a next image frame in said video signal;

discerning signal adding means for marking a point of said change in said video signal by adding said discerning signal to said video signal;

discerning signal extraction means for detecting said discerning signal in said video signal and for sending a detection signal when detecting said discerning signal; and control means for stopping image data of said video signal from being stored in the memory after receiving the freeze instruction signal from said keyboard means at a moment when said detection signal is received from said discerning signal extraction means, so that last two fields of said video signal stored in said memory and forming the freeze-frame are an even field and an odd field of the same frame.

9. An ultrasound imaging device having functions of storing data of at least one image in a memory and reading the data from the memory to show a freeze-frame on a display in response to a freeze instruction given by a user, said ultrasound imaging device comprising:

ultrasound scanning means for providing a video signal of ultrasound images which is made by transmitting ultrasound pulses and receiving echoes;

keyboard means for receiving the freeze instruction and sending a freeze instruction signal;

discerning signal generation means for generating a discerning signal which marks a change from one image frame to a next image frame in said video signal;

discerning signal adding means for marking a point of said change in said video signal by removing a mode signal positioned at a predetermined location of said video signal for indicating an operation mode of the ultrasound imaging device, wherein said predetermined location can be identified by said discerning signal when removing said mode signal;

discerning signal extraction means for sending a detection signal when detecting none of said mode signal in said predetermined location; and control means for stopping image data of said video signal from being stored in the memory after receiving the freeze instruction signal from said keyboard means at a moment when said detection signal is received from said discerning signal extraction means, so that last two fields of said video signal stored in said memory and forming the freeze-frame are an even field and an odd field of the same frame.

* * * * *